J. MARKUS.
PIG FORCEPS.
APPLICATION FILED JULY 8, 1920.

1,380,995.

Patented June 7, 1921.

Inventor
J. Markus
By D. Swift
his Attorney

UNITED STATES PATENT OFFICE.

JACOB MARKUS, OF CORSICA, SOUTH DAKOTA.

PIG-FORCEPS.

1,380,995.

Specification of Letters Patent.   Patented June 7, 1921.

Application filed July 8, 1920. Serial No. 394,656.

*To all whom it may concern:*

Be it known that I, JACOB MARKUS, a citizen of the United States, residing at Corsica, in the county of Douglas, State of South Dakota, have invented a new and useful Pig-Forceps; and I do hereby declare the following to be a full, clear, and exact description of the invention, such as will enable others skilled in the art to which it appertains to make and use the same.

The invention relates to veterinary instruments and has for its object to provide a device of this character particularly adapted for extracting animals, said device being formed from two pieces of wire so bent as to form pivotal points for two members, each of said members being provided with an engaging jaw and with a handle member adapted to be engaged by the fingers of the hand during an extracting operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
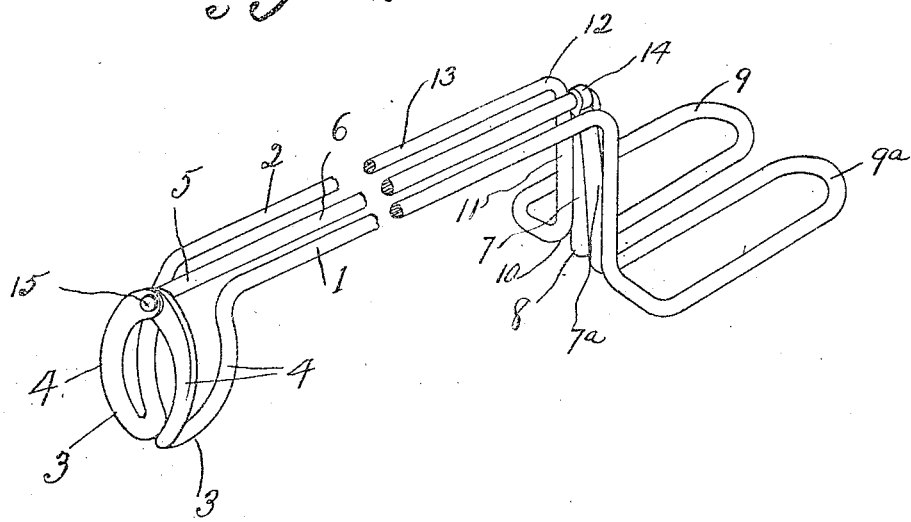
Figure 1 is a perspective view of the tool.
Figure 2:
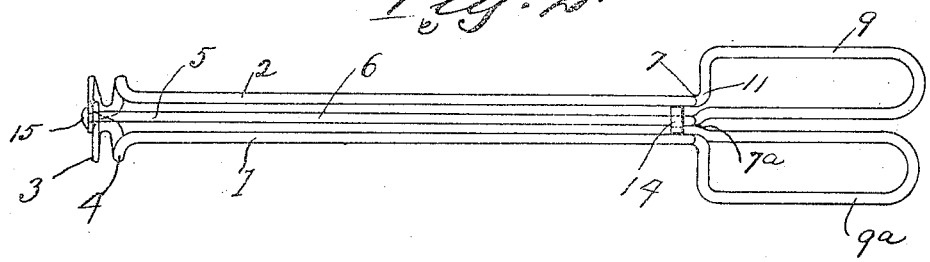
Fig. 2 is a top plan view of the tool.
Figure 3:
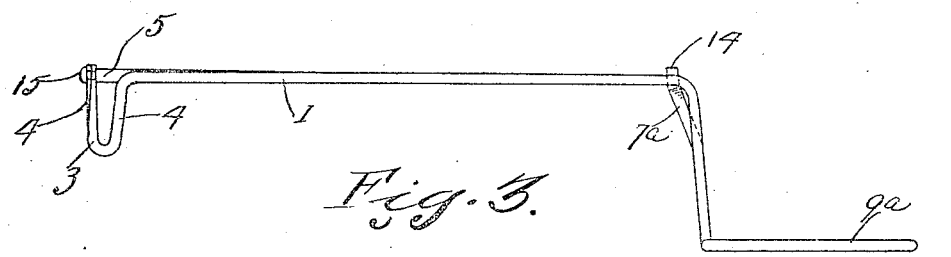
Fig. 3 is a side elevation of the tool.

Referring to the drawings, the numerals 1 and 2 designate the pivotally connected members, the outer ends of which are bent so as to form loops 3 adapted to engage the young animal during the extracting operation. The arms 4 of the loops are parallel with each other and the outer arms 4 are pivotally connected to the outer end 5 of the bar 6. Bar 6 extends rearwardly and is bent downwardly so as to form a vertical portion 7, said bar being bent as at 8 so as to form the finger engaging loops 9, in which loops the fingers engage when the device is in operation. The bar is again bent upwardly as at 10 so as to form the vertical portion 11, which is substantially parallel with the vertical portion 7, said vertical portion 11, being bent as at 12 so as to form the horizontal portion 13. Horizontal portion 13 merges into the loop 3. Thus it will be seen that one of the pivoted members, that is the pivoted member 2 is formed from a single piece of wire.

Member 1 is formed in the same shape and manner as the member 2 with the exception that said member 1 is not provided with a horizontal bar 6 and the vertical portion $7^a$ extending upwardly from the handle $9^a$ terminates in an eye 14, which eye forms a bearing in which the bar 6 rocks while the device is in use. The bearing of the eye 14 is in alinement with the pivotal point 15 of the arm 4, therefore it will be seen that when the handle members 9 and $9^a$ are forced apart that the jaws 3 will also be forced apart so that the jaws may grasp the animal and hold the same when the handle members 9 and $9^a$ are forced together.

From the above it will be seen that a forcep is provided which is positively in its operation and formed from two members pivotally united. It will also be seen that a device is formed from two pieces of wire or rod bent in such a manner as to form the pivoted members, thereby reducing the cost of manufacture to a minimum and at the same time producing an instrument which is positive in its action and one wherein common stock of wire or rod may be used for making the tool.

By so forming the tool it will be seen that the engaging jaws 3 extend downwardly at a right angle to the bar 6 so that the operator may observe the operation and at the same time by so extending the jaws downwardly and also disposing the handle members 9 and $9^a$ downwardly, said handle members will be so positioned that the holding action of the jaws 3 will be positive.

The invention having been set forth what is claimed as new and useful is:—

A device of the character described comprising a pair of longitudinally hingedly connected members, said members being formed from rods, the outer ends of which rods are bent so as to form engaging loops disposed at substantially a right angle to the body portion of each member, the rear ends of said members being bent at an angle to the body portions of the members and formed into loops adapted to be engaged by the hand, said loops being in a plane parallel to the bodies of the members, a longitudinally disposed portion carried by one of the members and disposed between the body members of the pivoted members, the outer end of the longitudinally disposed portion having pivoted thereto the ends of the outer vertical portions of the engaging loops, an arm extending upwardly from one handle member and an eye carried by said upwardly extending arm in which the longitudinally disposed portion is rockably mounted.

In testimony whereof I have signed my name to this specification in the presence of two subscribing witnesses.

JACOB MARKUS.

Witnesses:
 ARIE NYDAM,
 G. VAN ORENDONK.